United States Patent
Yang et al.

(10) Patent No.: US 7,362,593 B2
(45) Date of Patent: *Apr. 22, 2008

(54) SWITCHING CONTROL CIRCUIT HAVING OFF-TIME MODULATION TO IMPROVE EFFICIENCY OF PRIMARY-SIDE CONTROLLED POWER SUPPLY

(75) Inventors: Ta-yung Yang, Milpitas, CA (US); Guo-Kiang Hung, Sindian (TW); Jenn-yu G. Lin, Taipei (TW); Chuh-Ching Li, Jhongli (TW); Feng Cheng Tsao, Linbian Township, Pingtung County (TW)

(73) Assignee: System General Corp., Taiepi Hsien (TW)

( * ) Notice: Subject to any disclaimer, the term of this patent is extended or adjusted under 35 U.S.C. 154(b) by 205 days.

This patent is subject to a terminal disclaimer.

(21) Appl. No.: 10/943,668

(22) Filed: Sep. 16, 2004

(65) Prior Publication Data

US 2006/0055433 A1    Mar. 16, 2006

(51) Int. Cl.
*H02M 3/335* (2006.01)
(52) U.S. Cl. ............... 363/21.16; 363/21.13
(58) Field of Classification Search ............ 363/21.05, 363/21.08, 21.09, 21.1, 21.13, 21.16, 21.17, 363/21.18, 97, 131
See application file for complete search history.

(56) References Cited

U.S. PATENT DOCUMENTS

| | | | | |
|---|---|---|---|---|
| 4,302,803 A | | 11/1981 | Shelly ......................... 363/20 |
| 5,032,967 A | * | 7/1991 | Marinus et al. .......... 363/21.13 |
| 5,901,051 A | * | 5/1999 | Takahashi et al. ....... 363/21.18 |
| 5,903,452 A | * | 5/1999 | Yang ........................... 363/97 |
| 6,078,510 A | * | 6/2000 | Spampinato et al. .... 363/21.13 |
| 6,118,675 A | * | 9/2000 | Lionetto et al. ......... 363/21.13 |
| 6,545,882 B2 | * | 4/2003 | Yang ....................... 363/21.08 |
| 6,611,439 B1 | * | 8/2003 | Yang et al. .................... 363/41 |
| 6,661,679 B1 | * | 12/2003 | Yang et al. .................... 363/41 |
| 6,674,656 B1 | * | 1/2004 | Yang et al. ................ 363/21.1 |
| 6,744,649 B1 | * | 6/2004 | Yang et al. .................... 363/98 |
| 6,836,415 B1 | * | 12/2004 | Yang et al. ............. 363/21.01 |
| 6,842,350 B2 | * | 1/2005 | Yamada et al. .......... 363/21.16 |
| 6,853,563 B1 | * | 2/2005 | Yang et al. ............. 363/21.15 |
| 6,862,194 B2 | * | 3/2005 | Yang et al. .................... 363/16 |
| 6,912,141 B2 | * | 6/2005 | Konno ........................ 363/49 |
| 6,977,824 B1 | * | 12/2005 | Yang et al. ............. 363/21.16 |
| 7,016,204 B2 | * | 3/2006 | Yang et al. ............. 363/21.13 |
| 7,054,170 B2 | * | 5/2006 | Yang et al. ............. 363/21.18 |

(Continued)

*Primary Examiner*—Jeffrey Sterrett
(74) *Attorney, Agent, or Firm*—J.C. Patents

(57) ABSTRACT

A voltage-waveform detector produces a voltage-feedback signal and a discharge-time signal by multi-sampling a voltage signal of a transformer. The discharge-time signal represents a discharge time of a secondary-side switching current. A voltage-loop error amplifier amplifies the voltage-feedback signal and generates a control signal. An off-time modulator correspondingly generates a discharge-current signal and a standby signal in response to the control signal and an under-voltage signal. The under-voltage signal indicates a low supply voltage of the controller. An oscillator produces a pulse signal in response to the discharge-current signal. The pulse signal determines the off-time of the switching signal. A PWM circuit generates the switching signal in response to the pulse signal and the standby signal. The standby signal further controls the off-time of the switching signal and maintains a minimum switching frequency. The switching signal is used for regulating the output of the power supply.

11 Claims, 9 Drawing Sheets

U.S. PATENT DOCUMENTS 7,061,225 B2 * 6/2006 Yang et al. .............. 324/103 P
7,061,780 B2 * 6/2006 Yang et al. .............. 363/21.16
7,088,598 B2 * 8/2006 Yang et al. .............. 363/21.01

* cited by examiner

US 7,362,593 B2

SWITCHING CONTROL CIRCUIT HAVING OFF-TIME MODULATION TO IMPROVE EFFICIENCY OF PRIMARY-SIDE CONTROLLED POWER SUPPLY

BACKGROUND OF THE INVENTION

1. Field of the Invention

The present invention relates to a control circuit for a power supply, and more specifically, to a switching control circuit for switching mode power supplies.

2. Description of Related Art

Various power supplies have been widely used to provide regulated voltage. For the sake of safety, an off-line power supply is used to provide galvanic isolation between its primary side and secondary side. An optical-coupler and a secondary-side regulator are usually needed for regulating the output voltage of the off-line power supply. In order to reduce the device count and do without the secondary feedback circuit, a primary-side control technique has been disclosed in U.S. Pat. No. 4,302,803 "Rectifier-Converter Power Supply with Multi-Channel Flyback Inverter," issued to Randolph D. W. Shelly, on Nov. 24, 1981. However, foregoing prior art cannot meet the standard of accurate output voltage. Further, in such a design, the power consumption at light load condition is significantly high. Accordingly, the object of the present invention is to provide a switching control circuit for precisely controlling the output voltage of a power supply at the primary side without the optical-coupler and secondary-side regulator. In addition, an off-time modulation is developed to reduce the switching frequency and save the power consumption of the power supply at the light load condition.

SUMMARY OF THE INVENTION

A switching control circuit for a primary-side controlled power supply of the present invention comprises a switch for switching a transformer. A switching signal controls the switch for regulating the output voltage of the power supply. A controller is coupled to the transformer to generate a voltage-feedback signal by multi-sampling a voltage signal and a discharge time of the transformer during the off-time of the switching signal. A first operational amplifier and a first reference voltage develop a voltage-loop error amplifier to amplify the voltage-feedback signal and generate a control signal. The controller therefore generates the switching signal in response to the control signal. The controller comprises a voltage-waveform detector for multi-sampling the voltage signal and a discharge-time signal of the transformer to produce the voltage-feedback signal. The voltage-waveform detector is connected to an auxiliary winding of the transformer via a voltage divider. The discharge-time signal represents the discharge time of the transformer and stands for the discharge time of a secondary-side switching current. A PWM circuit controls the pulse width of the switching signal in response to the control signal. The output voltage is thus precisely regulated. An off-time modulator is developed to save the power consumption, in which a discharge-current signal and a standby signal are generated in response to the control signal and an under-voltage signal. The under-voltage signal indicates a low supply voltage of the controller. An oscillator is coupled to the discharge-current signal and the standby signal to generate a pulse signal for determining the off-time of the switching signal. The switching signal has a minimum switching frequency to switch the transformer for multi-sampling the voltage signal. The off-time of the switching signal is increased and the switching frequency is decreased in response to the decrease of the load and therefore the power consumption under light load condition is reduced.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, and together with the description, serve to explain the principles of the invention.

DESCRIPTION OF THE EMBODIMENTS

Figure 1:
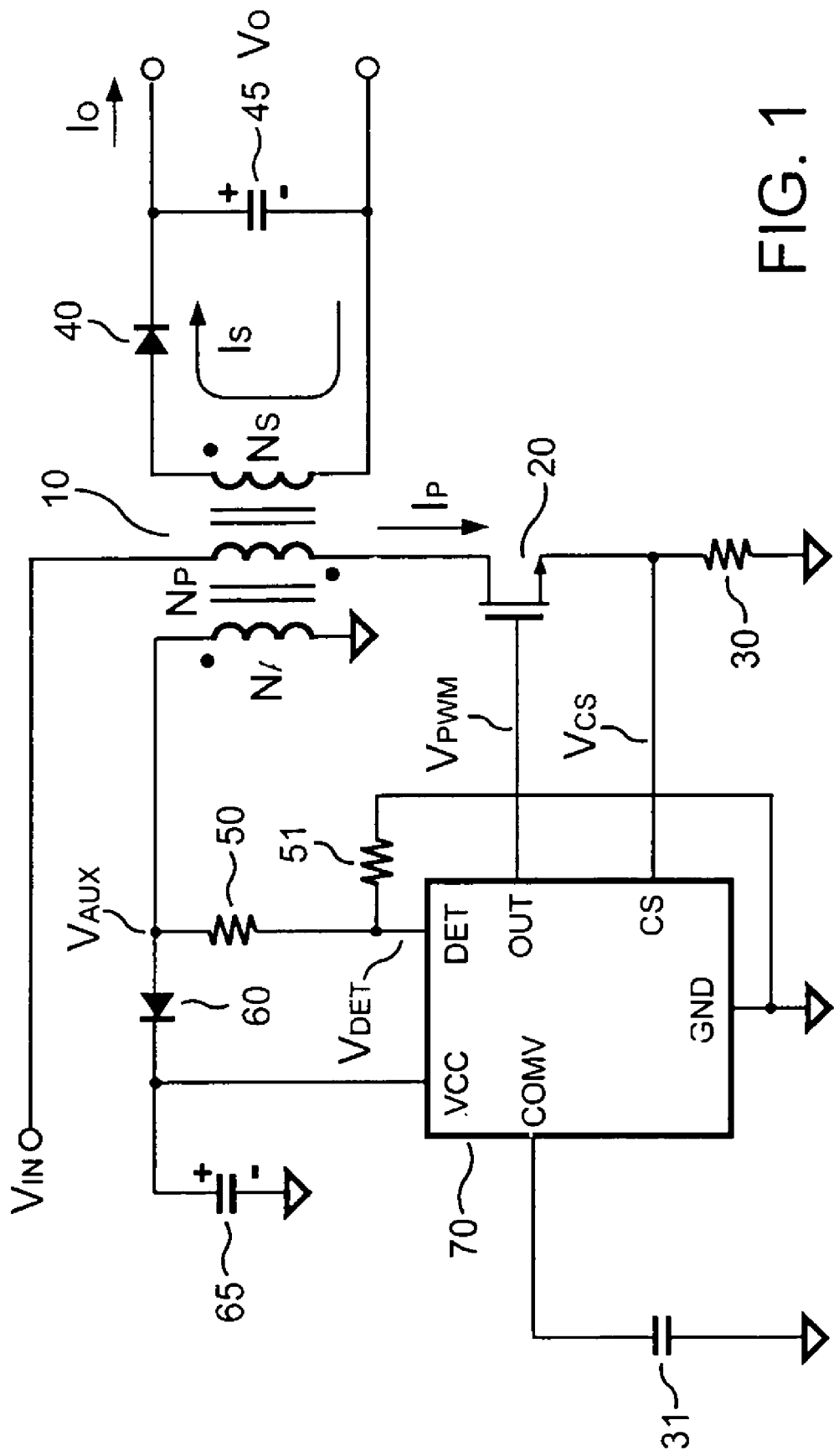
FIG. 1 shows a schematic diagram of a power supply having a switching control circuit.

FIG. 1 shows a power supply. The power supply includes a transformer 10 comprising an auxiliary winding $N_A$, a primary winding $N_P$, and a secondary winding $N_S$. The primary winding $N_P$ is coupled to an input voltage $V_{IN}$ of the power supply. In order to regulate an output voltage $V_O$ and/or an output current $I_O$ of the power supply, a switching control circuit includes a switching signal $V_{PWM}$ to control a switch, such as a transistor 20. A controller 70 generates the switching signal $V_{PWM}$.

Figure 2:
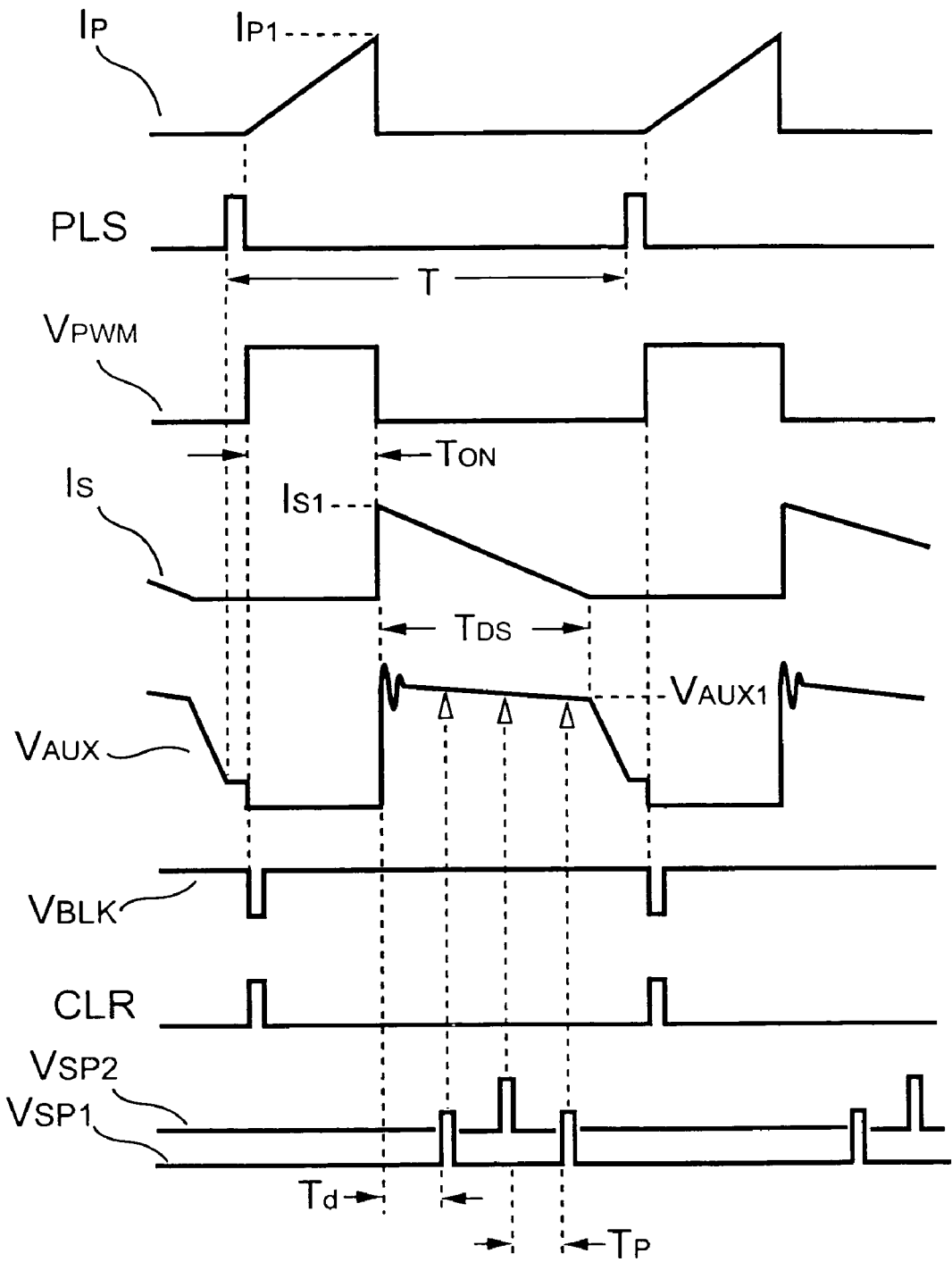
FIG. 2 shows key waveforms of the power supply and the switching control circuit.

FIG. 2 shows various signal waveforms of the power supply in FIG. 1. As the switching signal $V_{PWM}$ is logic-high, a primary-side switching current $I_P$ will be generated accordingly. A primary-side switching peak current $I_{P1}$ can be given by, $$I_{P1} = \frac{V_{IN}}{L_P} \times T_{ON} \qquad (1)$$

where $L_P$ is the inductance of the primary winding $N_P$ of the transformer 10; $T_{ON}$ is an on-time of the switching signal $V_{PWM}$.

Once the switching signal $V_{PWM}$ is logic-low, the energy stored in the transformer 10 will be transferred to the secondary side of the transformer 10 and to an output of the power supply via a rectifier 40. A secondary-side switching current $I_S$ is thus generated accordingly. A secondary-side switching peak current $I_{S1}$ can be expressed by, $$I_{S1} = \frac{(V_O + V_F)}{L_S} \times T_{DS} \quad (2)$$

where $V_O$ is the output voltage of the power supply; $V_F$ is a forward voltage drop of the rectifier 40; $L_S$ is the inductance of the secondary winding $N_S$ of the transformer 10; $T_{DS}$ is a discharge time of the transformer 10, and $T_{DS}$ also represents the discharge time of the secondary-side switching current Is.

Meanwhile, a voltage signal $V_{AUX}$ is generated at the auxiliary winding $N_A$ of the transformer 10. A voltage level $V_{AUX1}$ of the voltage signal $V_{AUX}$ can be expressed as, $$V_{AUX1} = \frac{T_{NA}}{T_{NS}} \times (V_O + V_F) \quad (3)$$

where $T_{NA}$ and $T_{NS}$ are respectively the winding turns of the auxiliary winding $N_A$ and the secondary winding $N_S$ of the transformer 10.

The voltage signal $V_{AUX}$ starts to decrease as the secondary-side switching current $I_S$ drops to zero. This also indicates that the energy of the transformer 10 is fully released at this moment. Therefore, as shown in FIG. 2, the discharge time $T_{DS}$ in equation (2) can be measured from the falling edge of the switching signal $V_{PWM}$ to the point when the voltage signal $V_{AUX}$ decreases. The peak value $I_{S1}$ of the secondary-side switching current $I_S$ is determined by the peak value $I_{P1}$ of the primary-side switching current $I_P$ and the winding turns of the transformer 10. The peak value $I_{S1}$ of the secondary-side switching current $I_S$ can be expressed as, $$I_{S1} = \frac{T_{NP}}{T_{NS}} \times I_{P1} \quad (4)$$

where $T_{NP}$ is the winding turns of the primary winding $N_P$ of the transformer 10.

The controller 70 comprises a power terminal VCC and a ground terminal GND for being powered. A voltage divider, formed by a resistor 50 and a resistor 51, for instance, is connected between the auxiliary winding $N_A$ of the transformer 10 and a ground reference level. A detection terminal DET of the controller 70 is connected to a joint of the resistor 50 and the resistor 51. A voltage $V_{DET}$ generated at the detection terminal DET can be given by, $$V_{DET} = \frac{R_{51}}{R_{50} + R_{51}} \times V_{AUX} \quad (5)$$

where $R_{50}$ and $R_{51}$ are respectively the resistance of the resistor 50 and the resistor 51.

The voltage signal $V_{AUX}$ further charges a capacitor 65 via a rectifier 60 for powering the controller 70. A current-sense resistor 30 is connected from a source of the transistor 20 to the ground reference level for converting the primary-side switching current $I_P$ to be a current signal $V_{CS}$. A sense terminal CS of the controller 70 is connected to the current-sense resistor 30 for detecting the current signal $V_{CS}$.

An output terminal OUT of the controller 70 provides the switching signal $V_{PWM}$ for switching the transformer 10. A compensation terminal COMV is connected to a compensation network for voltage-loop frequency compensation. The compensation network can be a capacitor connected to the ground reference level, such as a capacitor 31.

Figure 3:
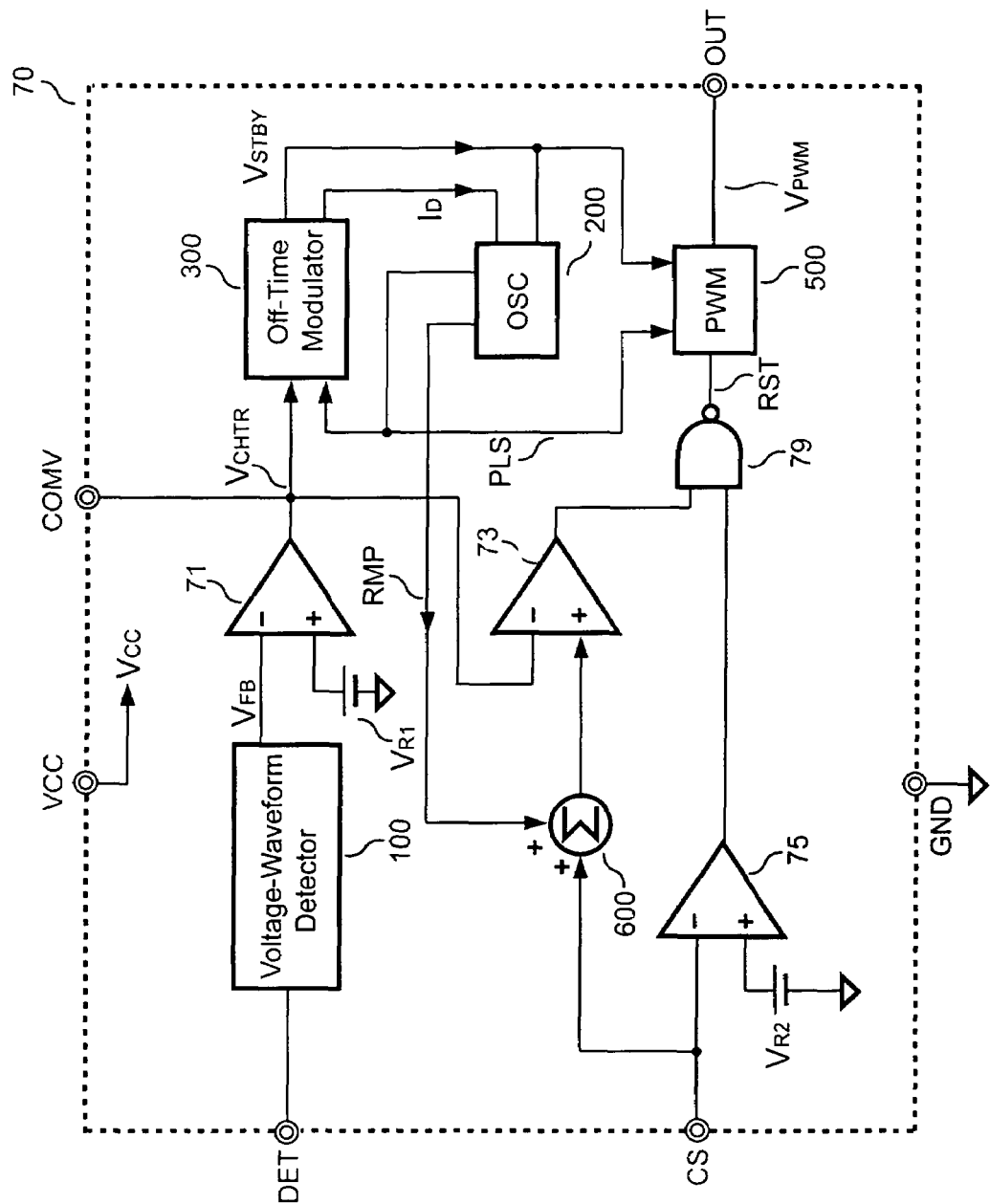
FIG. 3 shows one embodiment of a controller according to the present invention.

FIG. 3 shows one embodiment of the controller 70. A voltage-waveform detector 100 produces a voltage-feedback signal $V_{FB}$ and a discharge-time signal $S_{DS}$ by multi-sampling the voltage $V_{DET}$. The discharge-time signal $S_{DS}$ represents the discharge time $T_{DS}$ of the secondary-side switching current $I_S$. A positive input of an operation amplifier 71 is supplied with a reference voltage $V_{R1}$ and a negative input of the operation amplifier 71 is supplied with the voltage-feedback signal $V_{FB}$. The operational amplifier 71 generates a control signal $V_{CTR}$.

An off-time modulator 300 is coupled to a voltage-loop error amplifier to generate a discharge-current signal $I_D$ and a standby signal $V_{STB}$ in response to the control signal $V_{CTR}$. An oscillator 200 is coupled to the off-time modulator 300 to generate a pulse signal PLS and a ramp signal RMP. The pulse signal PLS is applied to initiate the switching signal $V_{PWM}$ and determine an off-time of the switching signal $V_{PWM}$. A comparator 75 and a reference voltage $V_{R2}$ develop a peak-current limiter to limit the maximum value of the primary-side switching current $I_P$. The input of the peak-current limiter is coupled to the sense terminal CS to detect the current signal $V_{CS}$ and to achieve a cycle-by-cycle current limit. A PWM circuit 500 is coupled to comparators 73, 75 via an NAND gate 79 to control the pulse width of the switching signal $V_{PWM}$ in response to the output of the voltage-loop error amplifier and the output of the peak-current limit. The NAND gate 79 generates a reset signal RST to reset the switching signal $V_{PWM}$ in response to the outputs of the comparators 73 and 75.

An output of the operational amplifier 71 is connected to the compensation terminal COMV and a positive input of the comparator 73. A negative input of the comparator 73 is connected to an output of an adder 600. The adder 600 generates a slope signal $V_{SLP}$ by adding the current signal $V_{CS}$ with the ramp signal RMP, which forms a slope compensation for the voltage-loop.

A voltage control loop is developed from the voltage signal $V_{AUX}$ sampling to the pulse width modulation of the switching signal $V_{PWM}$, which controls the magnitude of the voltage signal $V_{AUX}$ in response to the reference voltage $V_{R1}$. The voltage level $V_{AUX1}$ of the voltage signal $V_{AUX}$ and the output voltage $V_O$ are positive correlation as shown in equation (3). The voltage signal $V_{AUX}$ is further attenuated to the voltage $V_{DET}$ as shown in equation (5). The voltage-waveform detector 100 generates the voltage-feedback signal $V_{FB}$ by multi-sampling the voltage $V_{DET}$. The value of the voltage-feedback signal $V_{FB}$ is controlled in response to the value of the reference voltage $V_{R1}$ via the regulation of the voltage control loop. The voltage-loop error amplifier and the PWM circuit provide the loop gain for the voltage control loop. Therefore the output voltage $V_O$ can be briefly defined as, $$V_O = \left( \frac{R_{50} + R_{51}}{R_{51}} \times \frac{T_{NS}}{T_{NA}} \times V_{R1} \right) - V_F. \quad (6)$$

The voltage signal $V_{AUX}$ is multi-sampled by the voltage-waveform detector 100. The voltage signal $V_{AUX}$ is sampled and measured instantly before the secondary-side switching current $I_S$ falls to zero. Therefore the variation of the secondary-side switching current $I_S$ does not affect the value of the forward voltage drop $V_F$ of the rectifier 40.

Figure 4:
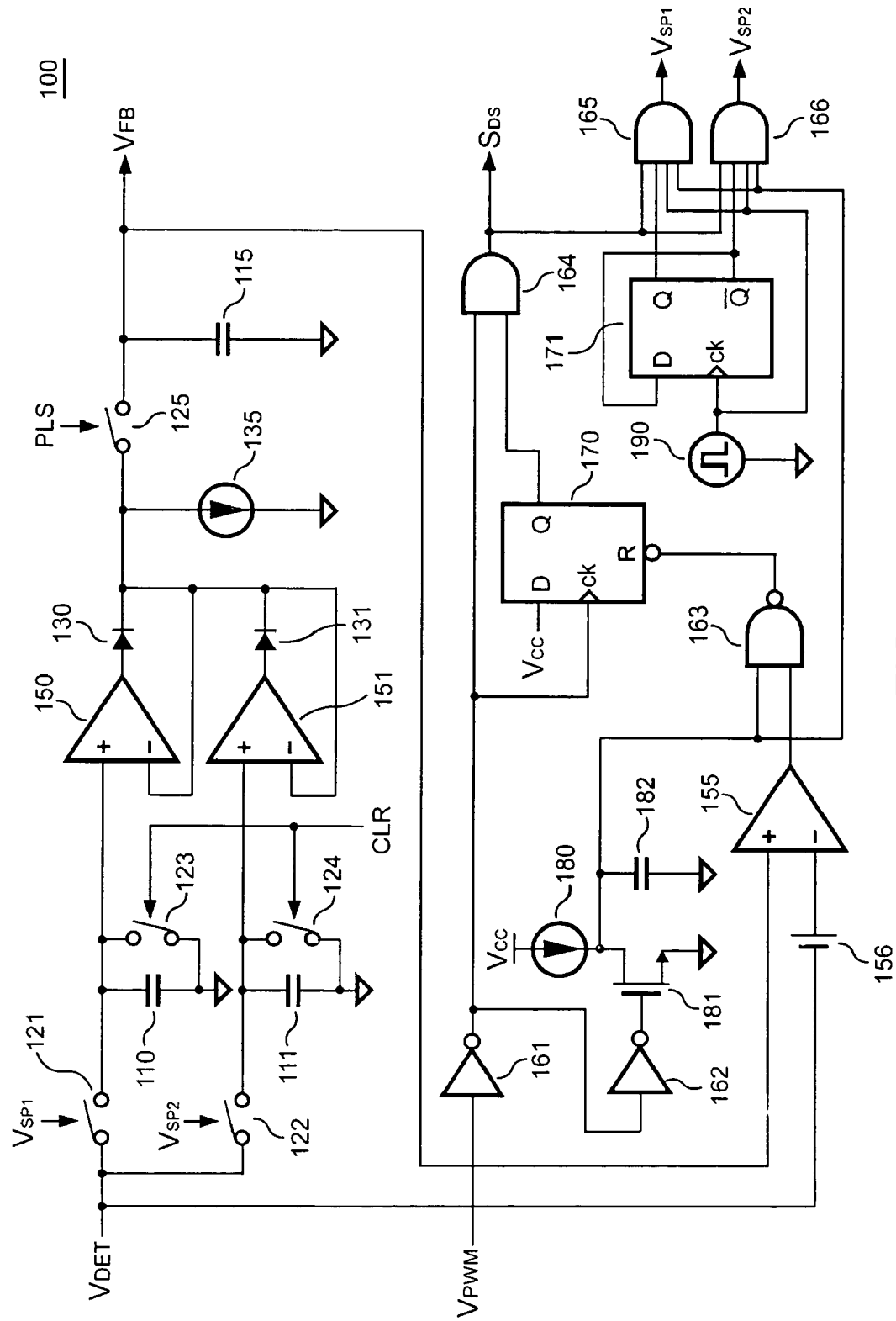
FIG. 4 shows one embodiment of a voltage-waveform detector according to the present invention.

FIG. 4 shows one embodiment of the voltage-waveform detector 100 according to the present invention. A sample-pulse generator 190 produces a sample-pulse signal for multi-sampling operation. A threshold signal 156 added to the voltage signal $V_{AUX}$ to produce a level-shift signal. A first signal generator including a D flip-flop 171, two AND gates 165, 166 generates a first sample signal $V_{SP1}$ and a second sample signal $V_{SP2}$. A second signal generator comprises a D flip-flop 170, a NAND gate 163, an AND gate 164 and a comparator 155 for producing the discharge-time signal $S_{DS}$. A time-delay circuit including an inverter 162, a current source 180, a transistor 181 and a capacitor 182 generates a delay time $T_d$ as the switching signal $V_{PWM}$ is logic-low. An input of an inverter 161 is supplied with the switching signal $V_{PWM}$. An output of the inverter 161 is connected to an input of the inverter 162, a first input of the AND gate 164 and a clock-input of the D flip-flop 170. An output of the inverter 162 turns on/off the transistor 181. A capacitor 182 is connected between a drain and a source the transistor 181. The drain of the transistor 181 is also an output of the time-delay circuit. The current source 180 is applied to charge the capacitor 182. Therefore the current of the current source 180 and the capacitance of the capacitor 182 determine the delay time $T_d$ of the time-delay circuit. A D-input of the D flip-flop 170 is pulled high with a supply voltage $V_{CC}$. An output of the D flip-flop 170 is connected to a second input of the AND gate 164. The AND gate 164 outputs the discharge-time signal $S_{DS}$. The discharge-time signal $S_{DS}$ is thus enabled as the switching signal $V_{PWM}$ is logic-low. An output of the NAND gate 163 is connected to a reset-input of the D flip-flop 170. Two inputs of the NAND gate 163 are respectively connected to the output of the time-delay circuit and an output of a comparator 155. An input of the comparator 155 is applied to the level-shift signal. Another input of the comparator 155 is applied to the voltage-feedback signal $V_{FB}$. Therefore, after the delay time $T_d$, the discharge-time signal $S_{DS}$ can be disabled once the level-shift signal is lower than the voltage-feedback signal $V_{FB}$. Besides, the discharge-time signal $S_{DS}$ can also be disabled as long as the switching signal $V_{PWM}$ is enabled.

The sample-pulse signal is applied to a clock-input of the D flip-flop 171 and third inputs of AND gates 165 and 166. A D-input and an inverse output of the D flip-flop 171 are connected together to form a divided-by-two counter. An output and the inverse output of the D flip-flop 171 are respectively connected to second inputs of AND gates 165 and 166. First inputs of AND gates 165 and 166 are also applied to the discharge-time signal $S_{DS}$. Fourth inputs of AND gates 165 and 166 are connected to the output of the time-delay circuit. Therefore a first sample signal $V_{SP1}$ and a second sample signal $V_{SP2}$ are respectively generated from outputs of the AND gates 165 and 166. Besides, the first sample signal $V_{SP1}$ and the second sample signal $V_{SP2}$ are alternately produced during an enabled period of the discharge-time signal $S_{DS}$. However, the delay time $T_d$ is inserted at the beginning of the discharge-time signal $S_{DS}$ to inhibit the first sample signal $V_{SP1}$ and the second sample signal $V_{SP2}$. The first sample signal $V_{SP1}$ and the second sample signal $V_{SP2}$ are thus disabled during the period of the delay time $T_d$.

The first sample signal $V_{SP1}$ and the second sample signal $V_{SP2}$ are used for alternately sampling the voltage signal $V_{AUX}$ via the detection terminal DET and the voltage divider. The first sample signal $V_{SP1}$ controls a switch 121 for obtaining a first hold voltage across a capacitor 110. The second sample signal $V_{SP2}$ controls a switch 122 for obtaining a second hold voltage across a capacitor 111. A switch 123 is connected in parallel with the capacitor 110 to discharge the capacitor 110. A switch 124 is connected in parallel with the capacitor 111 to discharge the capacitor 111. A buffer amplifier includes operational amplifiers 150 and 151, diodes 130, 131, and a current source 135 for generating a hold voltage. The positive inputs of operational amplifiers 150 and 151 are connected to the capacitor 110 and capacitor 111 respectively. The negative inputs of the operational amplifiers 150 and 151 are connected to an output of the buffer amplifier. The diode 130 is connected from an output of the operational amplifier 150 to the output of the buffer amplifier. The diode 131 is connected from an output of the operational amplifier 151 to the output of the buffer amplifier. The hold voltage is thus obtained from the higher voltage of the first hold voltage and the second hold voltage. The current source 135 is used for termination. A switch 125 periodically conducts the hold voltage to a capacitor 115 for producing the voltage-feedback signal $V_{FB}$. The switch 125 is turned on/off by the pulse signal PLS. The first sample signal $V_{SP1}$ and the second sample signal $V_{SP2}$ start to produce the first hold voltage and the second hold voltage after the delay time $T_d$, which eliminates the spike interference of the voltage signal $V_{AUX}$. The spike of the voltage signal $V_{AUX}$ would be generated when the switching signal $V_{PWM}$ is disabled and the transistor 20 is turned off.

The voltage signal $V_{AUX}$ starts to decrease as the secondary-side switching current $I_S$ drops to zero, which will be detected by the comparator 155 for disabling the discharge-time signal $S_{DS}$. The pulse width of the discharge-time signal $S_{DS}$ is therefore correlated to the discharge time $T_{DS}$ of the secondary-side switching current $I_S$. Meanwhile the first sample signal $V_{SP1}$ and the second sample signal $V_{SP2}$ are disabled, and the multi-sampling operation is stopped when the discharge-time signal $S_{DS}$ is disabled. At the moment, the hold voltage generated at the output of the buffer amplifier represents an end voltage. The end voltage is thus correlated to the voltage signal $V_{AUX}$ that is sampled just before the secondary-side switching current $I_S$ dropping to zero. The hold voltage is obtained from the higher voltage of the first hold voltage and the second hold voltage, which will ignore the voltage that is sampled when the voltage signal starts to decrease.

Figure 5:
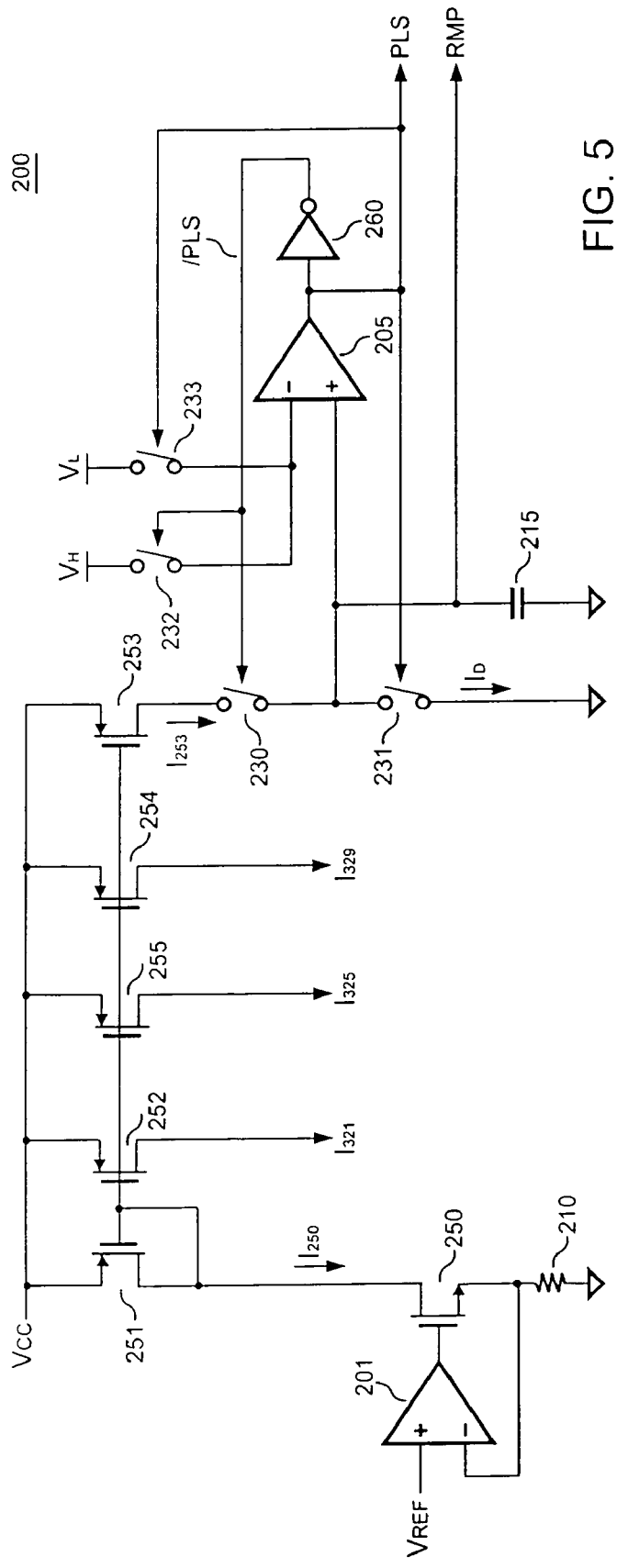
FIG. 5 shows one embodiment of an oscillator according to the present invention.

FIG. 5 shows one embodiment of the oscillator 200 according to the present invention. An operational amplifier 201, a resistor 210 and a transistor 250 form a first V-to-I converter. The first V-to-I converter generates a reference current $I_{250}$ in response to a reference voltage $V_{REF}$. A plurality of transistors, such as 251, 252, 253, 254 and 255 form current mirrors for generating a charge current $I_{253}$ and constant currents $I_{321}, I_{325}$ and $I_{329}$ in response to the reference current $I_{250}$. A drain of the transistor 253 generates the charge current $I_{253}$. A switch 230 is connected between the drain of the transistor 253 and a capacitor 215. A first terminal of a switch 231 is connected to the capacitor 215. A second terminal of the switch 231 is driven by the discharge-current signal $I_D$. The ramp signal RMP is obtained across the capacitor 215. A comparator 205 has a positive input connected to the capacitor 215. The comparator 205 outputs the pulse signal PLS. The pulse signal PLS determines the switching frequency. A first terminal of a switch 232 is supplied with a high threshold voltage $V_H$. A first terminal of a switch 233 is supplied with a low threshold voltage $V_L$. A second terminal of the switch 232 and a second terminal of the switch 233 are both connected to a negative input of the comparator 205. An input of an inverter 260 is connected to an output of the comparator 205 for producing an inverse pulse signal /PLS. The pulse signal PLS turns on/off the switch 231 and the switch 233. The inverse pulse signal /PLS turns on/off of the switch 230 and the switch 232.

Figure 6:
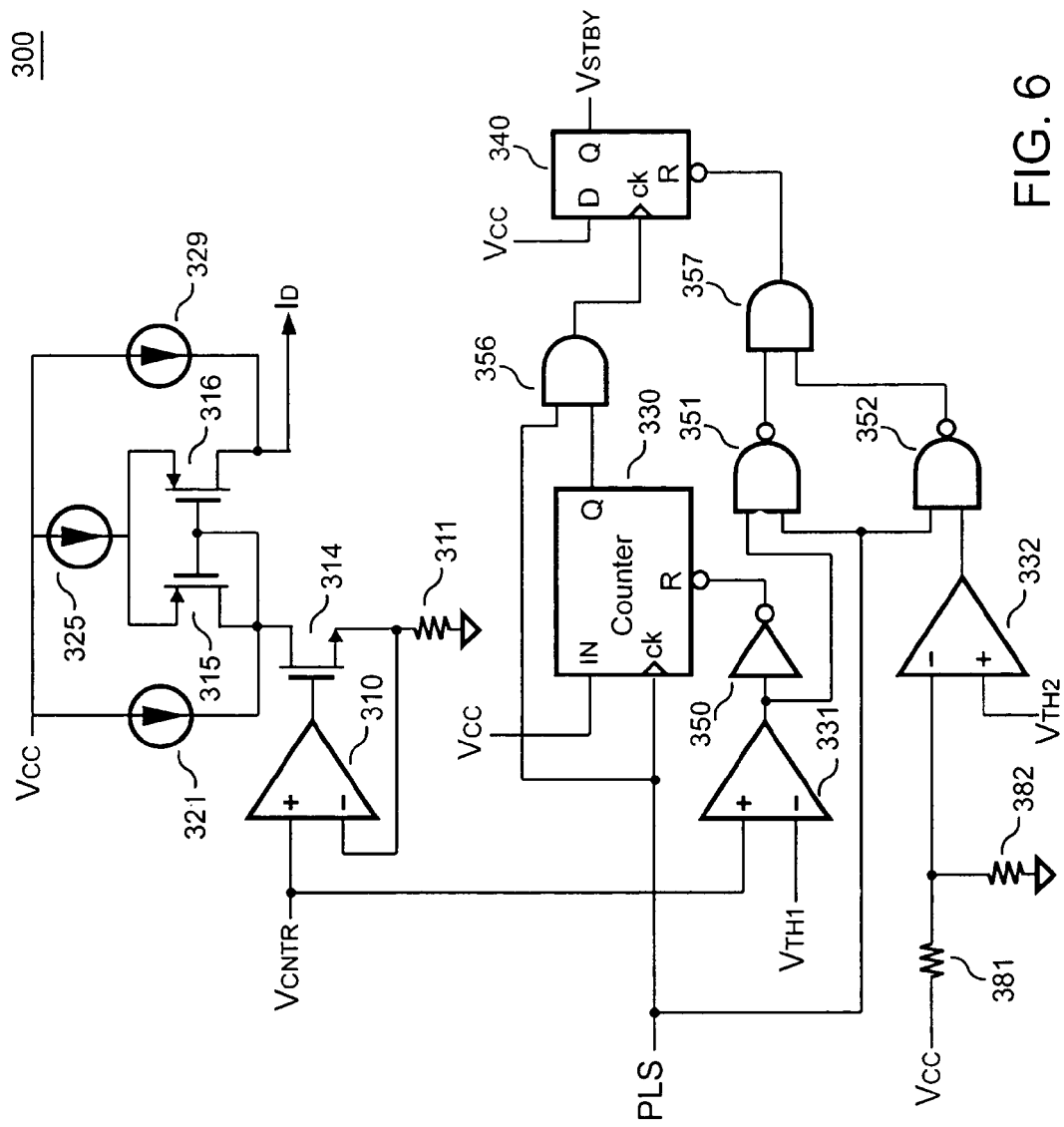
FIG. 6 shows one embodiment of an off-time modulator according to the present invention.

FIG. 6 shows an embodiment of the off-time modulator 300 according to the present invention. The off-time modulator 300 is coupled to the oscillator 200 for connecting a minimum-discharge current $I_{329}$, a maximum-discharge current $I_{325}$ and a threshold current $I_{321}$. An operational amplifier 310, a transistor 314 and a resistor 311 form a second V-to-I converter. The second V-to-I converter is used for generating a control current $I_{314}$ in response to the control signal $V_{CTR}$. The control current $I_{314}$ is coupled to the minimum-discharge current $I_{329}$, the maximum-discharge current $I_{325}$ and the threshold current $I_{321}$ to generate the discharge-current signal $I_D$. The control current $I_{314}$ is coupled to delete the threshold current $I_{321}$, and produce the discharge-current signal $I_D$ through a current mirror formed by transistors 315 and 316. The discharge-current signal $I_D$ is lowered as the control signal $V_{CTR}$ decreases. As the discharge-current signal $I_D$ decreases, the period of the pulse signal PLS and the off-time of the switching signal $V_{PWM}$ will be extended. However, the minimum-discharge current $I_{329}$ determines a minimum value of the discharge-current signal $I_D$. The maximum-discharge current $I_{325}$ clamps a maximum value of the discharge-current signal $I_D$. The voltage of the control signal $V_{CTR}$ is proportional to the load condition. Therefore the discharge-current signal $I_D$ is lowered as the load decreases. And the minimum value and the maximum value of the discharge-current signal $I_D$ are clamped.

A comparator 331 produces a first enable signal via an inverter 350 once the control signal $V_{CTR}$ is lower than a threshold voltage $V_{TH1}$. The comparator 331 also produces a first disable signal via a NAND gate 351 once the control signal $V_{CTR}$ is higher than the threshold voltage $V_{TH}$. A comparator 332 produces an under-voltage signal via a NAND gate 352 once an attenuated supply voltage of the controller is lower than a threshold voltage $V_{TH2}$. The attenuated supply voltage is attenuated from the supply voltage $V_{CC}$ via an attenuator, which is formed by resistors 381 and 382. A delay counter 330 having a delay time $T_{d1}$ generates a standby-enable signal once the first enable signal is enabled longer than the delay time $T_{d1}$. A standby-signal generator is formed by a register 340, AND gates 356, 357. The AND gate 356 is connected to the delay counter 330 to enable the standby signal $V_{STB}$ in response to the standby-enable signal. The standby signal $V_{STB}$ is disabled via the AND gate 357 in response to the first disable signal and the under-voltage signal.

Figure 7:
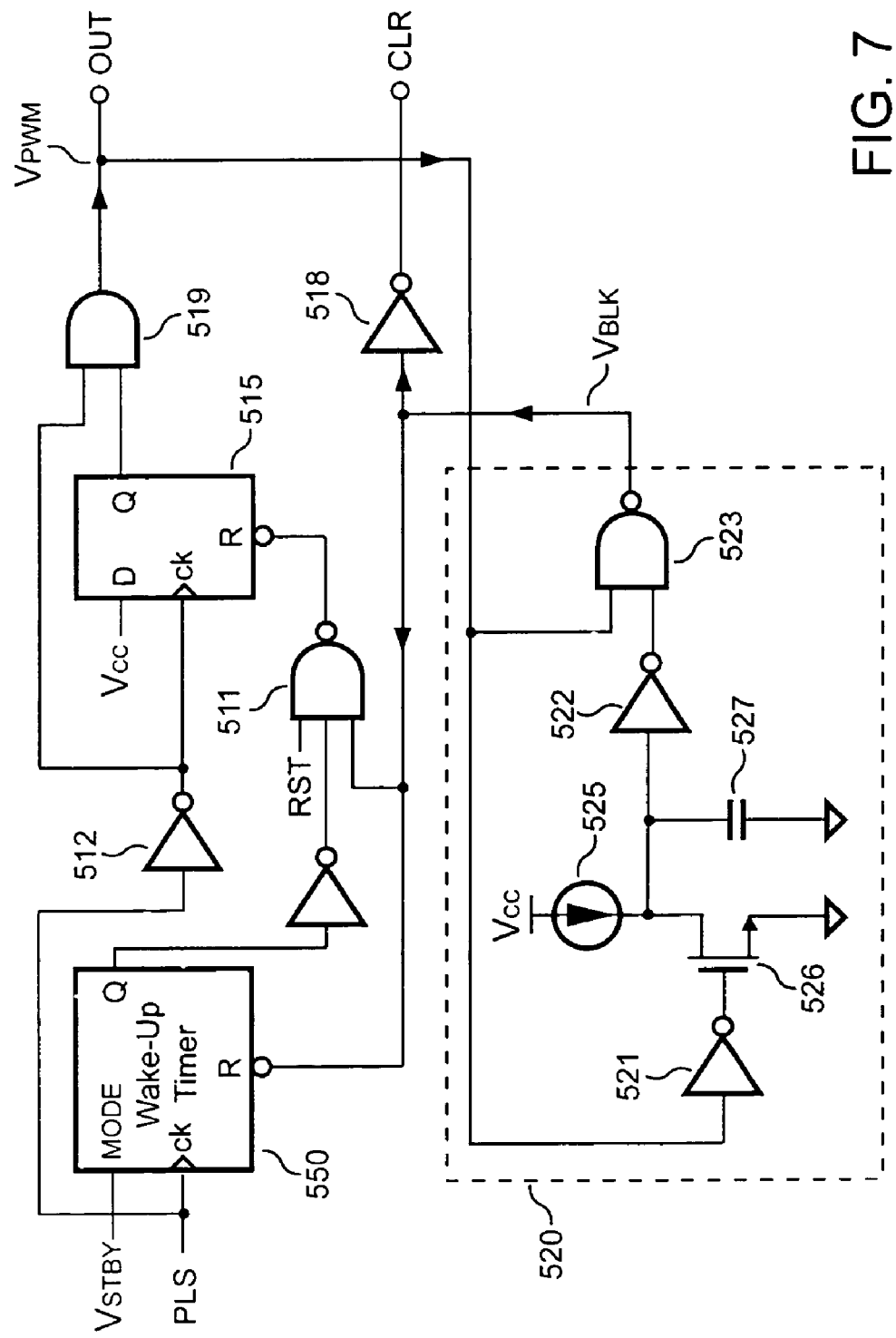
FIG. 7 shows one preferred embodiment of a PWM circuit according to the present invention.

FIG. 7 shows a schematic diagram of the PWM circuit 500 according to one embodiment of the present invention. The PWM circuit 500 includes a NAND gate 511, a D flip-flop 515, an AND gate 519, a blanking circuit 520, inverters 512, 518, 551 and a wake-up timer 550. A D-input of the D flip-flop 515 is pulled high with the supply voltage $V_{CC}$. The pulse signal PLS drives an input of the inverter 512. An output of the inverter 512 is connected to the clock-input of the D flip-flop 515 for enabling the switching signal $V_{PWM}$. An output of the D flip-flop 515 is connected to a first input of the AND gate 519. A second input of the AND gate 519 is coupled to the output of the inverter 512. The AND gate 519 outputs the switching signal $V_{PWM}$ to switch the power supply. The switching signal $V_{PWM}$ is disabled as the pulse signal PLS is enabled. Therefore the pulse width of the pulse signal PLS can control the off-time of the switching signal $V_{PWM}$.

A reset-input of the D flip-flop 515 is connected to an output of the NAND gate 511. A first input of the NAND gate 511 is supplied with the reset signal RST for cycle-by-cycle disabling the switching signal $V_{PWM}$. The second input of the NAND gate 511 is connected to an output of the blanking circuit 520 for ensuring a minimum on-time of the switching signal $V_{PWM}$ once the switching signal $V_{PWM}$ is enabled. The third input of the NAND gate 511 is connected to an output of the wake-up timer 550 via the inverter 551 to ensure the minimum switching frequency of the switching signal $V_{PWM}$. The minimum on-time of the switching signal $V_{PWM}$ will ensure a minimum value of the discharge time $T_{DS}$, which will ensure a proper multi-sampling operation for sampling the voltage signal $V_{AUX}$ in the voltage-waveform detector 100. The discharge time $T_{DS}$ is related to the on-time $T_{ON}$ of the switching signal $V_{PWM}$. With reference to equations (1), (2), (4) and (7), the discharge-time $T_{DS}$ can be expressed as equation (8), $$L_S = \left(\frac{T_{NS}}{T_{NP}}\right)^2 \times L_P \qquad (7)$$

$$T_{DS} = \left(\frac{V_{IN}}{V_O + V_F}\right) \times \frac{T_{NS}}{T_{NP}} \times T_{ON} \qquad (8)$$

An input of the blanking circuit 520 is supplied with the switching signal $V_{PWM}$. When the switching signal $V_{PWM}$ is enabled, the blanking circuit 520 will generate a blanking signal $V_{BLK}$ to inhibit the reset of the D flip-flop 515. The blanking circuit 520 further comprises a NAND gate 523, a current source 525, a capacitor 527, a transistor 526 and inverters 521, 522. The switching signal $V_{PWM}$ is applied to an input of the inverter 521 and the first input of the NAND gate 523. The current source 525 is applied to charge the capacitor 527. The capacitor 527 is connected between a drain and a source of the transistor 526. An output of the inverter 521 turns on/off the transistor 526. An input of the inverter 522 is coupled to the drain of the transistor 526. An output of the inverter 522 is connected to a second input of the NAND gate 523. An output of the NAND gate 523 outputs the blanking signal $V_{BLK}$. The current of the current source 525 and the capacitance of the capacitor 527 determine the pulse width of the blanking signal $V_{BLK}$. The input of an inverter 518 is connected to the output of the NAND gate 523. An output of the inverter 518 generates a clear signal CLR to turn on/off switches 123 and 124.

Figure 8:
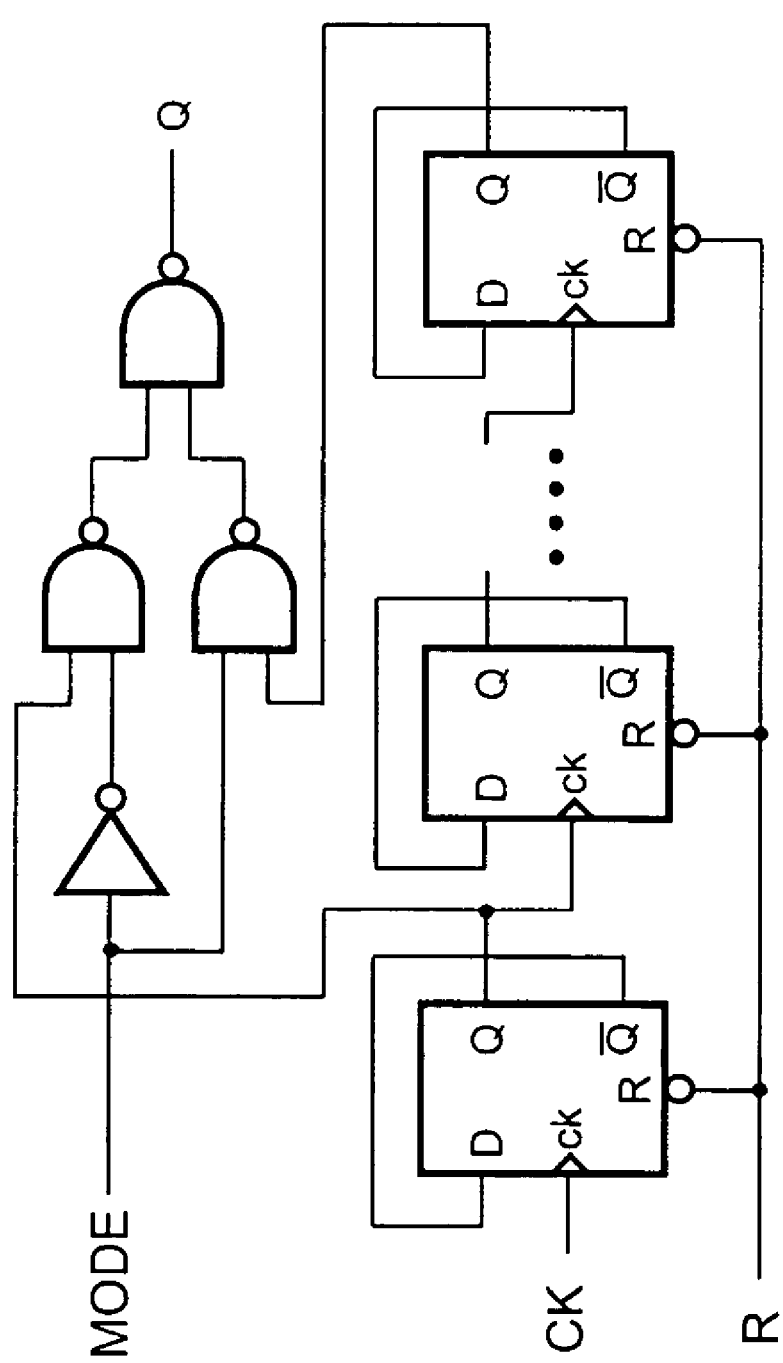
FIG. 8 shows one preferred embodiment of a wake-up timer according to the present invention.

The minimum switching frequency of the switching signal $V_{PWM}$ ensures a switching of the transformer 10 for multi-sampling the voltage signal $V_{AUX}$. The wake-up timer 550 is coupled to the off-time modulator 300 to generate a wake-up signal and enable the switching signal $V_{PWM}$ in response to the standby signal $V_{STB}$. A permanent reset signal RST might be produced if the voltage-waveform detector 100 samples an extremely high voltage due to the overshoot of the output voltage $V_O$, which would result in a permanent disabled switching signal $V_{PWM}$. Nevertheless, the wake-up timer 550 will enable $V_{PWM}$. The timer of the wake-up timer 550 is counted by the pulse signal PLS. A reset input of the wake-up timer 550 is supplied with the blanking signal $V_{BLK}$. Therefore, the wake-up timer and the wake-up signal will be reset once the switching signal $V_{PWM}$ is generated. A mode input of the wake-up timer 550 is coupled to the standby signal $V_{STB}$. The wake-up timer 550 will generate the wake-up signal for every cycle of the pulse signal PLS as the standby signal $V_{STB}$ is disabled. Once the standby signal $V_{STB}$ is enabled, the wake-up timer 550 will generate the wake-up signal after the specific cycles of the pulse signal PLS, which ensures a minimum switching frequency of the switching signal $V_{PWM}$. FIG. 8 shows a schematic diagram of the wake-up timer 550.

Figure 9:
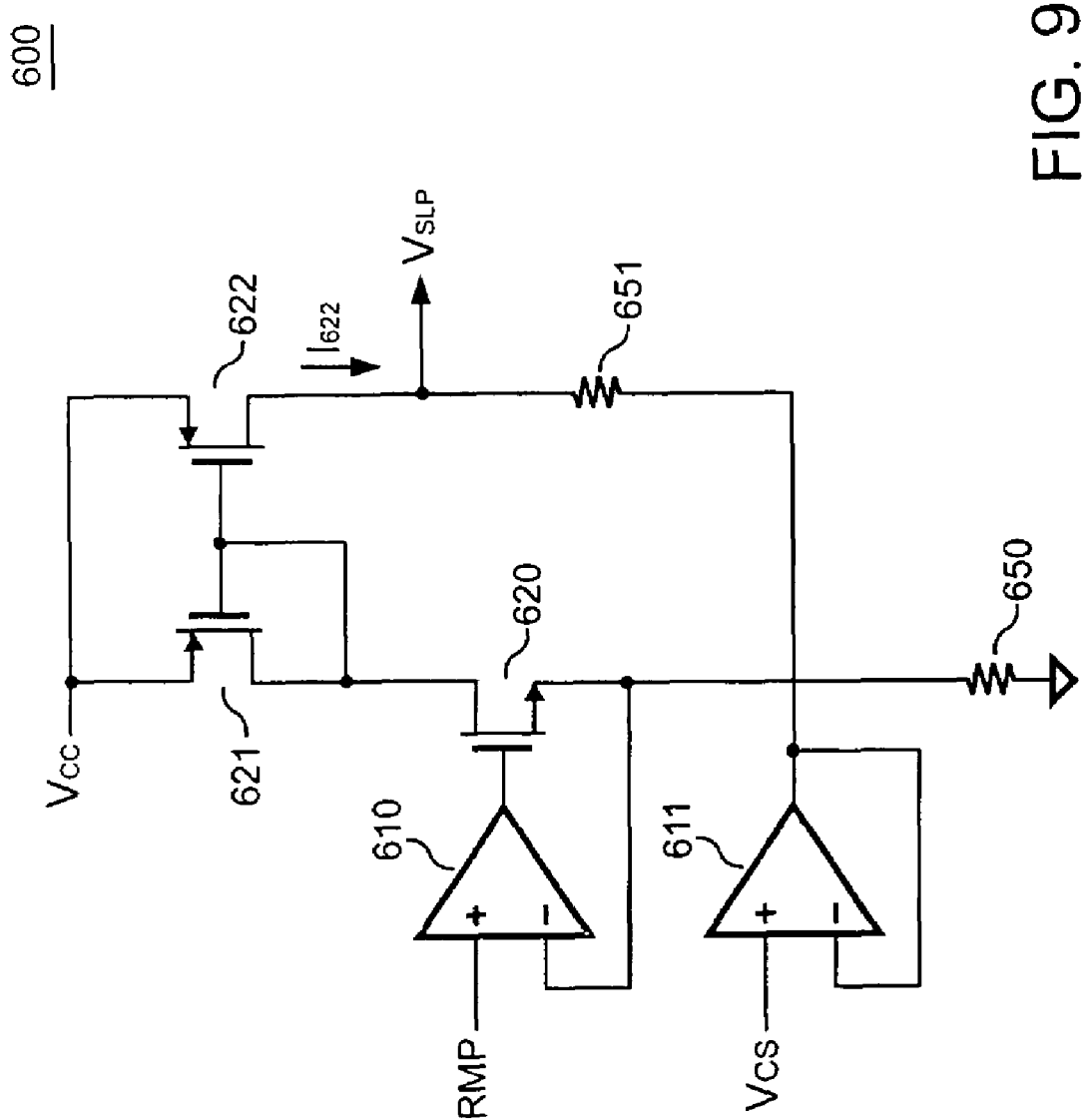
FIG. 9 shows one preferred embodiment of an adder according to the present invention.

FIG. 9 shows an embodiment of the adder 600 according to the present invention. An operational amplifier 610, transistors 620, 621, 622 and a resistor 650 develop a third V-to-I converter for generating a current $I_{622}$ in response to the ramp signal RMP. A positive input of an operational amplifier 611 is applied to the current signal $V_{CS}$. A negative input and an output of the operational amplifier 611 are connected together to build the operational amplifier 611 as a buffer. A drain of the transistor 622 is connected to the output of the operational amplifier 611 via a resistor 651. The slope signal $V_{SLP}$ is generated at the drain of the transistor 622. The slope signal $V_{SLP}$ is therefore correlated to the ramp signal RMP and the current signal $V_{CS}$.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching control circuit for a primary-side controlled power supply, comprising:
   a switch, for switching a transformer, wherein said transformer is supplied with an input voltage of said power supply;
   a switching signal, driving said switch for regulating an output voltage of said power supply; and
   a controller, coupled to said transformer to generate a voltage-feedback signal by multi-sampling a voltage signal and a discharge time of said transformer when said switching signal is logic-low; said controller generating said switching signal in response to a control signal, wherein an error amplifier produces said control signal in response to said voltage-feedback signal; said controller further increasing an off-time of said switching signal in response to the decrease of said control signal, wherein said switching signal keeps a minimum switching frequency to switch said transformer for sampling said voltage signal.

2. The switching control circuit as claimed in claim 1, said controller controlling said off-time of said switching signal in response to said control signal and an under-voltage signal, wherein said under-voltage signal indicates a low supply voltage of said controller and decreases said off-time of said switching signal.

3. The switching control circuit as claimed in claim 1, wherein said controller comprises:
   a voltage-waveform detector, coupled to said transformer, producing said voltage-feedback signal by multi-sampling said voltage signal and said discharge time of said transformer through an auxiliary winding of said transformer;
   a voltage-loop error amplifier, for amplifying said voltage-feedback signal and generating said control signal;
   an off-time modulator, generating a discharge-current signal and a standby signal in response to said control signal, wherein said discharge-current signal is decreased in proportion to the decrease of said control signal;
   an oscillator, generating a pulse signal and a ramp signal in response to said discharge-current signal, wherein the increase of said pulse width of said pulse signal is proportional to the decrease of said discharge-current signal;
   an adder, coupled to a current-sense device and supplied with said ramp signal, generating a slope signal; and
   a PWM circuit, generating said switching signal in response to said pulse signal, said control signal, said slope signal and said standby signal, wherein said pulse width of said switching signal is regulated by said control signal and said slope signal; the increase of said off-time of said switching signal is proportional to the increase of said pulse width of said pulse signal; said standby signal further controls said off-time of said switching signal for keeping a minimum switching frequency of said switching signal.

4. The switching control circuit as claimed in claim 3, wherein said voltage-waveform detector comprises:
   a sample-pulse generator, for producing a sample-pulse signal;
   a threshold signal, wherein said threshold signal adds said voltage signal to produce a level-shift signal;
   a first capacitor and a second capacitor;
   a first signal generator, producing a first sample signal and a second sample signal, wherein said first sample signal and said second sample signal are used for alternately sampling said voltage signal, wherein a first hold voltage and a second hold voltage are respectively held across said first capacitor and said second capacitor, wherein said first sample signal and said second sample signal are alternately generated in response to said sample-pulse signal during an enabled period of said discharge-time signal, wherein a delay time is inserted at the beginning of said discharge-time signal, wherein said first sample signal and said second sample signal are disabled during the period of said delay time;
   a buffer amplifier, generating a hold signal from the higher voltage of said first hold voltage and said second hold voltage;
   a first output capacitor, producing said voltage-feedback signal by sampling said hold signal; and
   a second signal generator, producing said discharge-time signal, wherein said discharge-time signal is enabled as said switching signal is disabled, wherein after said delay time, said discharge-time signal can be disabled once said level-shift signal is lower than said voltage-feedback signal, wherein said discharge-time signal can also be disabled as long as said switching signal is enabled.

5. The switching control circuit as claimed in claim 3, wherein said voltage-waveform detector multi-samples said voltage signal to generate an end voltage for producing said voltage-feedback signal, wherein said end voltage is sampled and measured instantly before said secondary-side switching current drops to zero.

6. The switching control circuit as claimed in claim 3, wherein said off-time modulator comprises:
   a minimum-discharge current and a maximum-discharge current;
   a threshold current;

a V-to-I converter, generating a control current in response to said control signal, in which said control current is coupled to said minimum-discharge current, said maximum-discharge current and said threshold current generate said discharge-current signal, and said control current is coupled to delete said threshold current for producing said discharge-current signal, wherein a minimum value of said discharge-current signal is determined by said minimum-discharge current, wherein a maximum value of said discharge-current signal is clamped by said maximum-discharge current;

a first threshold voltage, producing a first enable signal once said control signal is lower than said first threshold voltage, and producing a first disable signal once said control signal is higher than said first threshold voltage;

a second threshold voltage, producing said under-voltage signal once an attenuated supply voltage of said controller is lower than said second threshold voltage;

a delay counter having a counter-delay time to generate a standby-enable signal once said first enable signal is enabled longer than said counter-delay time; and a standby-signal generator coupled to said delay counter to enable said standby signal in response to said standby-enable signal, wherein said standby signal is disabled in response to said first disable signal and said under-voltage signal.

7. The switching control circuit as claimed in claim 3, wherein said oscillator comprises:

a first V-to-I converter, for generating a charge current and reference currents, in response to a reference voltage;

an oscillator capacitor;

a first switch, wherein a first terminal of said first switch is supplied with said charge current and a second terminal of said first switch is connected to said oscillator capacitor;

a second switch, wherein a first terminal of said second switch is connected to said oscillator capacitor and a second terminal of said second switch is driven by said discharge-current signal;

a first comparator, having a non-inverting input connected to said oscillator capacitor, wherein said first comparator generates said pulse signal;

a third switch, having a first terminal supplied with a high-threshold voltage and a second terminal connected to an inverting input of said first comparator;

a fourth switch, having a first terminal supplied with a low-threshold voltage and a second terminal connected to said inverting input of said first comparator; and an inverter, having an input connected to an output of said first comparator for producing an inverse pulse signal, wherein said pulse signal turns on/off said second switch and said fourth switch, wherein said inverse pulse signal turns on/off said first switch and said third switch.

8. The switching control circuit as claimed in claim 3, wherein said PWM circuit comprises:

a switching-signal generator, coupled to said oscillator to generate said switching signal in response to said pulse signal, wherein said switching signal is initiated in response to said falling-edge of said pulse signal, wherein said pulse signal disables said switching signal in response to the enabling of said pulse signal for providing said off-time for said switching signal; said switching-signal generator is further coupled to said control signal and said slope signal to control the pulse width of said switching signal;

a blanking circuit, enabling a minimum on-time of said switching signal in response to a logic-on state of said switching signal;

a wake-up timer, coupled to said off-time modulator to enable said switching signal in response to said standby signal, wherein said wake-up timer will enable said switching cycle for every cycle of said pulse signal in response to the disablement of said standby signal; once said standby signal is enabled, said wake-up timer will enable said switching cycle after specific cycles of said pulse signal, which ensures a minimum switching frequency of said switching signal.

9. The switching control circuit as claimed in claim 1, wherein said switching signal having a minimum on-time once said switching signal is enabled, which further ensures a minimum value of said discharge time for multi-sampling said voltage signal.

10. A switching control circuit for a primary-side controlled power supply comprising:

a switch, for switching a transformer having at least one auxiliary winding and at least one secondary-side winding;

a switching signal applied to said switch, wherein said switching signal is controlled by a detection voltage in response to an output voltage of said auxiliary winding and a detection current in response to a switching current of said switch;

a controller, coupled to said transformer, wherein said controller detects a voltage variation of said auxiliary winding and a current variation of said switch, then generates said switching signal with a switching frequency larger than zero for continuously switching said switch to induce continuous energy variation on said auxiliary winding, said controller comprising:

an oscillator, generating a frequency signal;

a voltage control loop, developed from said voltage variation of said auxiliary winding, which is in accordance with said switching signal, an error amplifier comparing said voltage variation with a reference voltage, a comparator comparing an output of said error amplifier with said current variation of said switch, and a PWM generator generating said switching signal for said switch in response to an output of said comparator;

an adder, adding to said frequency signal with said current variation of said switch; and a duty cycle modulator generating a modulation signal to said PWM generator for adjusting said switching signal and to said oscillator for adjusting said frequency signal in response to said voltage variation of said auxiliary winding and said frequency signal.

11. A method for switching a primary-side controlled power supply, said method comprising the steps of:

sensing a current variation of a switching current;

sensing a voltage variation of an auxiliary winding;

generating a control signal in response to comparing said voltage variation of said auxiliary winding with a reference voltage;

generating a modulated current variation signal in response to combining said current variation signal with a frequency signal from an oscillator;

generating a PWM controlling signal in response to comparing said modulated current variation of said switching current with said control signal;

generating a PWM switching signal in response to said PWM controlling signal and said frequency signal via a PWM generator by inputting said PWM controlling signal and said frequency signal to said PWM generator; and generating a modulated duty cycle signal to said oscillator and said PWM generator in response to said control signal and said frequency signal via a duty cycle modulator.

* * * * *